Sept. 22, 1970 L. PETERS 3,529,976
EMBOSSMENT PACKAGING FOR SOFT FOODS
Filed Feb. 21, 1968 3 Sheets-Sheet 1
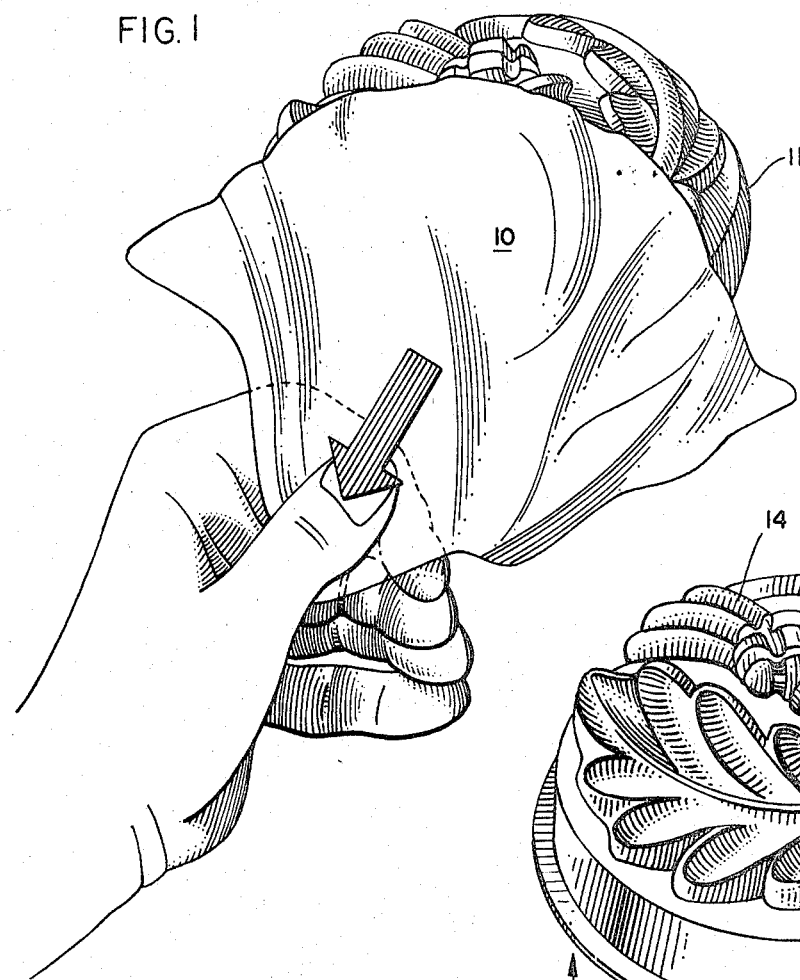
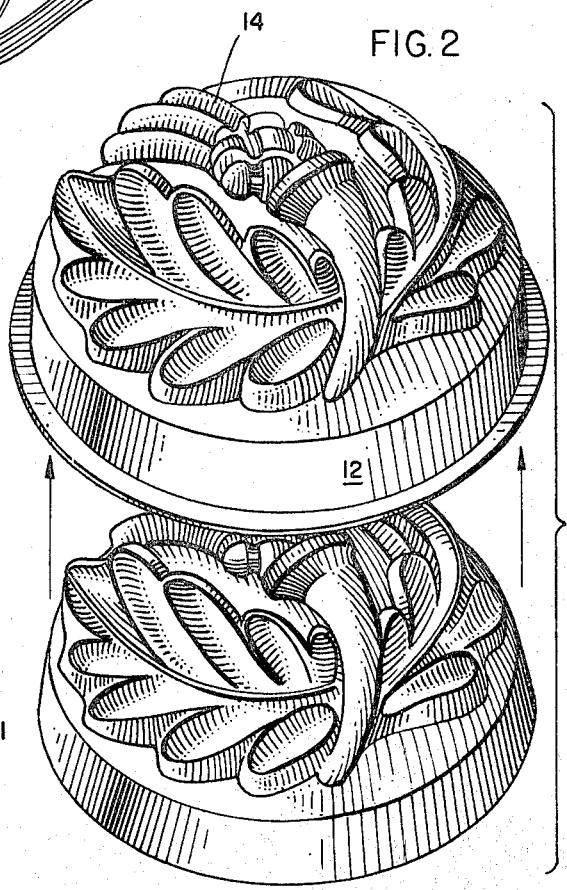
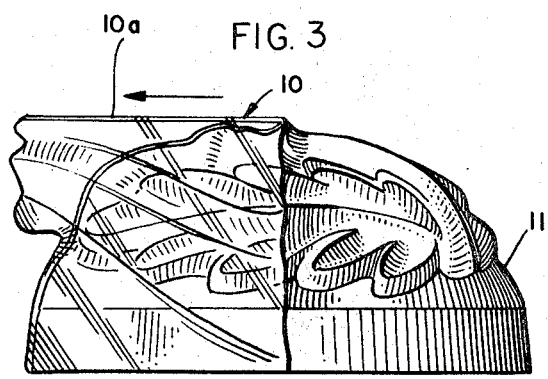
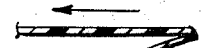
INVENTOR:
LEO PETERS
BY
Dawson, Tilton, Fallon & Lungmus
ATT'YS Sept. 22, 1970     L. PETERS     3,529,976
EMBOSSMENT PACKAGING FOR SOFT FOODS
Filed Feb. 21, 1968     3 Sheets-Sheet 2
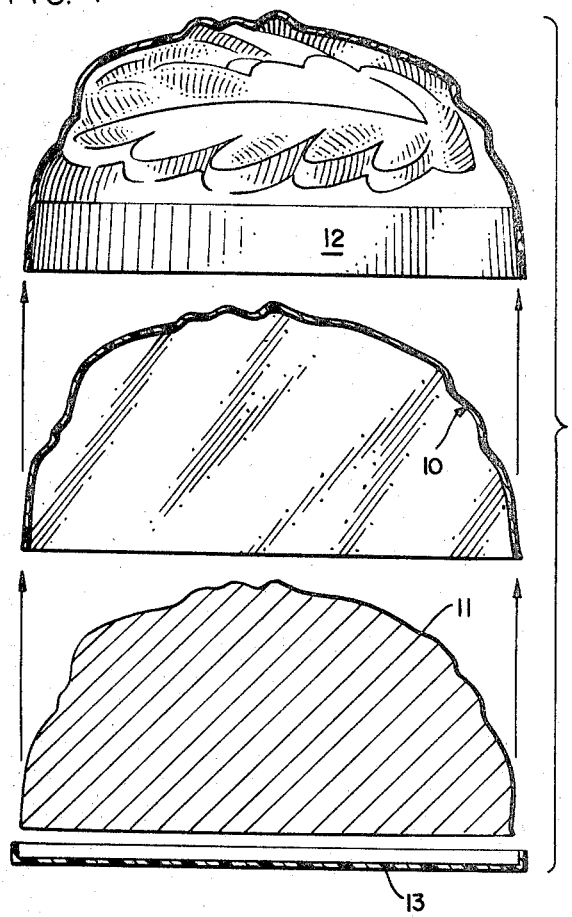
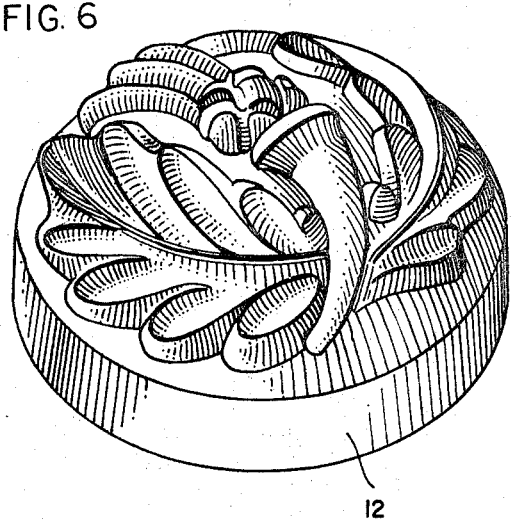
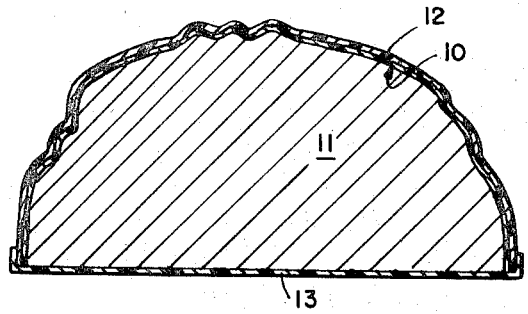
INVENTOR:
LEO PETERS
BY
Dawson, Tilton, Falloy & Lungmus
ATT'YS Sept. 22, 1970  L. PETERS  3,529,976
EMBOSSMENT PACKAGING FOR SOFT FOODS
Filed Feb. 21, 1968  3 Sheets-Sheet 3
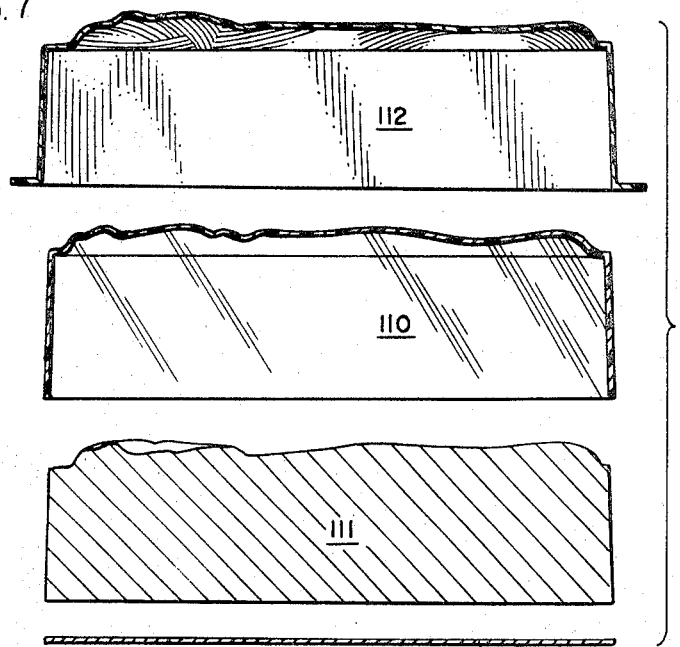
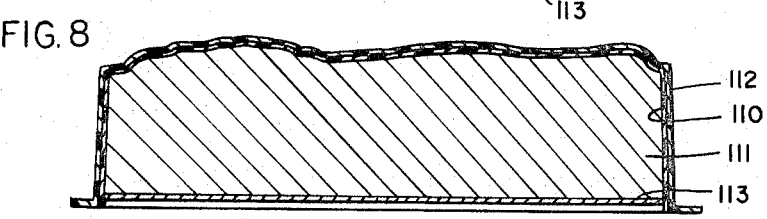
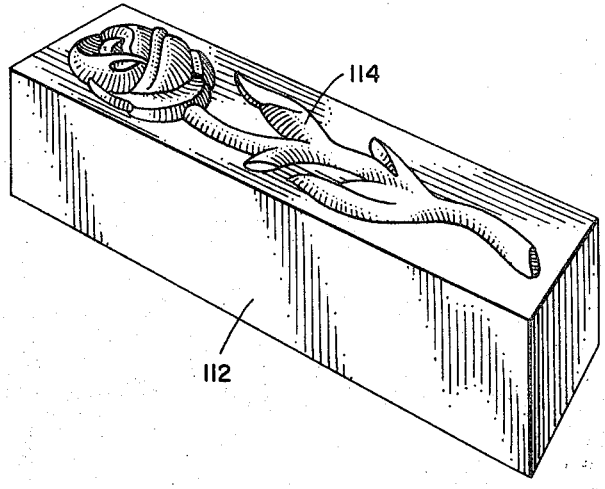
INVENTOR:
LEO PETERS
BY
Dawson, Tilton, Fallon & Lungmus
ATT'YS

United States Patent Office 3,529,976
Patented Sept. 22, 1970

3,529,976
EMBOSSMENT PACKAGING FOR SOFT FOODS
Leo Peters, 750 Plymouth Road SE.,
Grand Rapids, Mich. 49506
Filed Feb. 21, 1968, Ser. No. 707,035
Int. Cl. B65b 25/06
U.S. Cl. 99—179                                    3 Claims

ABSTRACT OF THE DISCLOSURE

A package for soft, edible materials such as butter or margarine including a rigid plastic receptacle having an open bottom with at least 50% of the top of the receptacle being embossed, a thin-flexible soft thermoplastic liner having a thickness of the order of about 0.0005" in conforming relation to the interior of the embossed surface and the receptacle being filled with the soft, edible material so that the material can be removed from the receptacle by a dumping action after which the liner can be peeled from the embossed surface of the soft material without destroying the fine detail thereof.

BACKGROUND OF THE INVENTION

This invention is especially adapted for packaging soft margarine, but it is also useful with other foods having similar soft bodies at point-of-end use, for example: soft butter, homogenized peanut butter, soft cheeses, candies, gelatins, etc. For purposes of illustration, the ensuing description will use soft margarine as exemplary.

Soft margarine is visibly characterized by a body that is so soft, so lacking in cohesiveness, that it cannot be packaged in a bodily self-supporting cube or stick form, but must be contained in cups that are independently self-supporting. Further, the soft margarine is almost flowable by gravity at 70° F. and at normal household refrigeration temperatures of about 45° F., it offers virtually no resistance to knifing (a knife will sink into it under the knife's own weight).

This special functional appeal of soft margarine for consumers is based on its exceptionally easy spreadability even at refrigerated temperatures. The softness of soft margarine is achieved by having a much higher percentage of its ingredients in the liquid phase rather than in the hydrogenated fat or fully emulsified phase than is normal for regular margarine. As much water and/or liquid oil is put into soft margarine as possible while still having the total body emulsion at, or slightly above, the liquid or phase at 70° F. It is a body so close to being characterized as a liquid, or being in a non-fat phase, that a few degrees rise above 70° F. makes it flowable merely by gravity.

Such a body has a much lower cohesive strength than does a margarine body in which all, or most, of the oils are in the hydrogenated (hardened) fat phase. It is a body so lacking in cohesiveness that it cannot practicably be contained in non-self-supporting wrappers, but must be contained in a rigid, independently-self-supporting cup because the body of this margarine lends no support or strength to the package structure.

A natural consequence and characteristic of the low cohesive strength of soft margarine is its inability to release cleanly from the wrapping materials normally used for regular margarine. Its adhesive strength in clinging to regular wrapping materials is so much greater than its internal cohesive strength that it cannot be unwrapped cleanly. Soft margarine will adhere to such wrappers before it will cohere to its own body. As a result, any attempt to package it in such wrappers produces such a mess in shipment and at the time of unwrapping that none of it is packaged in the kind of materials used for wrapping regular margarine.

Soft margarine presently can be marketed commercially only if it is packaged in relatively rigid self-supporting cups. Removal of soft margarine from such cups can then be effected only by digging or scooping it out, then scrapping it clean from the inside walls of the cups. The absolute impossibility of removing soft margarine intact as a unitary body from any kind of presently known wrapper or plain-walled, smooth-surfaced cup, under the normal conditions of home use, is presently accepted as a non-alterable fact of commercial life in today's margarine industry. Thus, to suggest to this industry that it might be possible to remove intact as a unitary body from its package, soft margarine contained in a package that did not have plain-walled, smooth-surfaced sides, but had a multi-cubic-dimensioned, finely delineated, embossment on its inside surface would seem extremely unrealistic. It is this seemingly unrealistic achievement that is the general objective of this invention.

To achieve this, a package is provided which performs four functions; (I) Producing finely delineated, multi-cubic- dimensioned embossments on the upper surfaces of foods such as soft margarine; (II) providing a protective, embossment-conforming and interlocking cover for carrying such embossed interlocked surfaces through the channels of trade without marring them; (III) enabling all packaging materials to be removed, stripped, and/or peeled away from the embossed food surfaces at the point-of-end use—this being provided through a thin, flexible integral covering and receptacle-following web of material functioning as a release agent between the embossed receptacle and the margine, and functioning to adhere to the margarine but not to the embossed cover or receptacle at the time the margarine is released from or dumped out of the cover or receptacle; and (IV) leaving the integrity of the exposed embossed surfaces intact.

In one sense, the overall combination described herein is an improvement over my earlier Pat. No. 2,750,294. That patent also related to the packaging of soft food and included a "peelable" film interposed between the material and the confining receptacle. The type of film employed in my previous patent is completely inadequate for the purposes of the present invention. It is critical to provide a film of the characteristics specified herein in order to permit the satisfactory and advantageous peelability of the film from the soft margarine or other like food. Generally speaking, the peelable film must be so constituted that upon release from the surface of the margarine it assumes a generally flat or uncontoured condition which the films employed in the practice of my prior patent could not do. Attempts to employ teachings of my prior patent for the packaging of soft margarine resulted in the same phenomena previously described herein relative to the use of non-self-supporting wrappers. The soft margarine clung to the surface of the wrapper or film of my prior patent, utterly destroying the desired surface configuration.

The invention is described in conjunction with the accompanying drawings, in which—

FIG. 1 is a perspective view of a quantity of soft margarine in the process of having the thin-flexible film peeled therefrom;

FIG. 2 is a perspective view of the configuration of FIG. 1 in a prior stage of "unpackaging," i.e., the removal therefrom of the outer confining receptacle or inverted cup;

FIG. 3 is a side elevational view of the product of FIG. 1 showing the film being stripped from the soft food mass;

FIG. 3A is an enlarged fragmentary sectional view of the upper central portion of FIG. 3;

FIG. 4 is an exploded sectional view of the packaging seen in FIG. 2;

FIG. 5 is a sectional view on smaller scale than that of FIG. 4 and showing the various elements in confronting, contacting relation;

FIG. 6 is a perspective view of the packaging seen in FIGS. 4 and 5; and

FIGS. 7–9 are views essentially similar in arrangement and constitution to FIGS. 4–6 but having to do with a modified form of the invention, i.e., a rectangular solid of soft margarine as contrasted to a hemisphere.

In the illustration given and with particular reference to FIG. 1, the important step of peeling a film generally designated 10 from a soft plastic mass, i.e., margarine 11 is featured. Reference to FIG. 3, shows that the film after it has been removed from the body is no longer equipped with the embossed configuration but is able to stand straight out as at 10a—so designated in FIG. 3. A conforming, confronting receptacle 12 is also employed in the packaging, the step of removing this being clearly illustrated in FIG. 2.

The last element of the packaging combination is the bottom closure 13 which is seen in FIGS. 4 and 5.

At present, I find two distinctive shapes desirable for commercialization, one being of the hemispherical variety seen in FIGS. 1–6 and the other being generally a rectangular solid having the upper surface embossed, and this being depicted in FIGS. 7–9. In those views, the mass 111 of soft material is seen to be confined by means of the flexible film 110 with shipping being accomplished when these two elements are protected and confined by the receptacle 112 and bottom closure 113. In the FIGS. 1–6 embodiment the closure member is designated 13.

It will be noted by comparing the second and third drawing sheets (FIGS. 4–6 versus FIGS. 7–9) that the outer receptacles or containers have different walls at the open ends thereof. It is to be appreciated, therefore, that any flange or rim is a matter of choice and the type of bottom closure likewise lacking criticality to the practice of the invention—merely that the closure provide a closed package acceptable according to contemporary health standards.

As to the outer receptacles 12 or 112, these must be cheap enough to be disposable but light enough and thin enough to permit the formation of embossments having surfaces with lines of delineation as fine as $\frac{1}{64}''$ wide at their apices and at the points where they diverge into multi-cubic lines of dimension. On the other hand, these receptacles must be heavy and strong enough to provide the embossed surfaces of soft margarine with a covering that will offer protection against damage while in transit through the channels of trade. The contradictory requirements of lightness and thinness versus heaviness and thickness must be balanced and compromised against each other to produce the desired embossed surfaces and the protection and low cost required for the commercial feasibility of this invention. To reconcile these contradictory requirements, I prefer to use pre-formed receptacles made from any of the several commercially-available thermoplastic materials that can be heat drawn into shape. Thus, the invention contemplates the usage of cheap, disposable but self-supporting receptacles no thicker or heavier than necessary to withstand the pressures of a one-pound content fill and protect the embossed surfaces of the soft margarine against damage while on route through the channels of trade, yet being thin enough and light enough to produce embossments with lines of definition at least $\frac{1}{64}''$ at their narrowest points.

As to the film 10 or 110 which is to be considered as both a divider and a release agent, two important characteristics relate to its thinness and flexibility. For the optimum thinness, there is a range from 0.001″ down to the commercially practical optimum thinness of 0.0005″. It is this degree of thinness in cooperation with the "optimum flexibility" that are the principal contributors to two critically necessary functions of the invention, namely: (I) formability, i.e., the ability to form delicately defined multi-cubic-dimensioned embossed surfaces on soft margarine. For example, in using a ½-mil thickness film (0.0005″) I have a delicacy of the order that even if a fold-over of the film upon itself should occur within the multi-cubic-dimensioned embossing die, I still have only a 1 mil thickness which is so delicate a buildup as to be practically unnoticeable. That is, it would produce a line of fold-over so delicate that it would still be 8 times more delicate than the $\frac{1}{64}''$ width of my most delicate surface embossments. (II) Peelability, i.e., the film's ability to peel cleanly from the embossed surfaces of soft margarine so that at the precise point of peel the film can literally lay back upon itself at a 180° angle at this critical point that is so sharp that it is, for all practical purposes, reduced to zero as illustrated in FIG. 3A.

Optimum flexibility may be described in terms of bending resistance to a film's own weight. It is possible, of course, to have a film of extreme thinness that is also relatively stiff and non-flexible, one that will remain erect and unbending under its own weight. Such a film will not peel off soft-embossed surfaces in the manner this invention requires. It is also possible to have a film of optimum flexibility, but not of optimum thinness. Such a film will not produce the sharpness of definition needed for delicate embossments, nor the peelability needed to maintain the integrity of finely embossed surfaces of soft margarine at the time of removal from its package. For the preferred purposes of this invention, the divider-release-agent must have an optimum commercial flexibility, flexibility that may be further characterized by its ability to bend perpendicularly at a sharp 90° angle under its own unsupported flat weight, and to collapse under its own erected weight. Then for the practical use of my invention, it must be (1) easy to drape in smooth form-fitting alignment without wrinkling into and over the delicate multi-cubic-dimensioned surfaces of my embossing receptacles, so that when soft margarine is flowed into the film-covered receptacles' surfaces, it will accurately accept the surface definitions of such surfaces, and then (2) have the ability to peel back upon itself at a 180° angle to produce a knife-sharp edge at the point where the film breaks contact with the embossed surfaces during the peeling off operation as illustrated in FIG. 3A. Such a point of contact-release is necessary to reduce to absolute minimum the area of margarine-to-film adhesion at this critical point and thus, in turn, reduce to a minimum the forces of cohesion needed in the body of soft margarine to maintain its body and surface intact against the pull exerted by the adhesion and peel off forces at the point of contact-release.

In operation, I find the application of the film 10 to the receptacle 12 is advantageously achieved by a stretch-draw operation, as is well known in the art. Other ways of providing a film in conforming relation to the interior of a cup or like receptacle can likewise be employed satisfactorily in the practice of the invention. As indicated above, flexibility is critical to the invention and the particular kind of flexibility is best defined in such functional terms as, limpness, drapability, softness, having multi-cubic dimensional flexibility, i.e., having an amorphous body without any lines of strain—without resistance to bending or flexing in any direction. Such a film is available from the Marathon Division of American Can Company and may be either polypropylene or polyethylene. The materials available are tested according to the "Noll Test" (Modern Packaging Magazine, July 1963). As stated in the Modern Packaging Magazine article, the Noll testing apparatus raised a looped specimen of the film against a breaker which activates an unbonded strain gauge, giving rise to a current proportional to the force. This apparatus gives readings of softness in grams, with the gram readings increasing as the softness of the films decreases. The gram reading given by the Noll testing apparatus for a particular film can be used as a direct measurement of the softness of the film. However, since gram readings for relatively soft films may be small, Noll used an alternative scale which was obtained by dividing the number 1000 by the gram readings. This provides an ascending scale to measure increasing degrees of flexibility, more accurately characterized by the term "softness." Either scale may be used as a measure of softness since one scale is merely the inverse of the other multiplied by a factor of 1000. However, as used herein, "Noll Test" softness or rating will refer to the reciprocal of the gram reading multiplied by 1000. For example, two of the softest films in commercial use are certain polyethylene and polypropylene 1¼ mil thick films used to wrap bread. The Noll Test rates comparable samples of these films as follows: 180 for the polyethylene and 360 for the polypropylene. On a gram scale, the ratings would be 5.55 grams and 2.78 grams, respectively. Thus, with these particular samples, polypropylene is twice as soft as a comparable grade and thinness of polyethylene. However, different formulations of the same basic films can be varied to produce different degrees of softness even though both are the same thickness. For example, two different 1 mil films of polypropylene may give Noll softness readings of 225 for one and 400 for another.

When this invention is used for soft margarine, I prefer the optimum in present commercial thinness (1 mil or less) and the optimum softness (a Noll reading of 225 or more). The preferred thinness and softness enable the film to function as a perfectly-conforming, skin-tight, but non-adhering (to the receptacle) divider-release agent on the inside of the package cover for the purpose of producing embossments of highest integrity on the top surfaces of the package's foot contents, while at the same time these film properties enable the film to be peeled away from the soft margarine embossed surfaces easily and cleanly by the consumer when the film-covered embossed surfaces have been released from the package cover.

The receptacle-providing part (designated 12 and 112) is preferably made of thermoplastic material having multi-cubic-dimensioned preformed female patterns on those surfaces needed to emboss the surfaces of cubes of margarine and do so in a manner that enables it to function on a filling line as the female member of an embossing die-set operation, and made within a thickness range that is preferably about 5 to 15 mils depending on the relative stiffness of the plastic material. Within this range, it is thin enough to be both relatively inexpensive and formable into fine delicate definitions, yet thick enough to provide the self-supporting rigidity needed to protect the embossed surfaces of soft margarine; and made with extensively embossed surfaces (at least 50% of its top surface areas) to provide greatly increased strength and rigidity compared with plain and/or flat surfaces of the same material. This construction enables, in some instances, to use a thickness as low as 5 mils for the receptacle. This is an advantage that lowers cost and greatly increases the range and delicacy of the designs for the embossment.

The practice of the invention results in substantial savings and capital investment due to the usage of the receptacle as a die and further there is maintenance of perfect embossed cooperating, interlocking, surface alignment between the receptacle 12 or 112 and the correspondingly embossed margarine contents. This pertains throughout the entire package life cycle from the time of production to the time of consumer end use. Because there is no transfer of embossed margarine out of its embossing die at the production plant, the male to female interlocking contact is left undisturbed until time of consumer end use. There is no hazard of refitting and realigning into some other cover which played no part in the formation of the margarine embossed surface. Thus, perfect integrity of the embossment is guaranteed through to the final consumer.

Maintenance of the cooperative interlocking between mating surfaces, that automatically takes place in an embossing operation, provides a built-in guarantee against any embossed-surface side shift or movement of an embossment-damaging type that is always present in any package whose inside surfaces do not precisely correspond to, or are not interlocked with, the surfaces of its contents. In this invention there is a three-way permanent (until opened by the final consumer) cooperating interlock between the three embossing elements of the package, namely, the embossed contents, the liner-divider-release-agent and the embossing cover receptacle which is, in effect, a female die. The guarantee of content-surface immobility provided by this kind of interlocking is given even greater surety by the extensive (at least 50%) coverage of the interlocking surfaces with embossments. This is readily seen at 114 in FIG. 9. It will be noted that the embossment 14 of the FIGS. 1–6 embodiment is likewise extensive. It is a guarantee, too, that is a major requirement for the successful packaging of embossed-surfaced soft margarine because consumers purchase embossed-surfaced products for the sake of their embossed surfaces, so a guarantee must be present that this product can be served on the table with the embossments intact. I find that it is a fortuitous set of circumstances, therefore, that results in the need for commercial in-transit protection of embossed soft surfaces supplied by the very structure, i.e., the cooperative permanent immobile interlocking relationship between the mating surfaces of the three members, that actually needs the protection.

While in the foregoing specification, a detailed description of the invention has been set down for the purpose of illustration, many variations of the details hereingiven may be made by those skilled in the art without departing from the spirit and scope of the invention.

I claim:

1. A package containing butter or margarine comprising a relatively rigid thin-walled receptacle having an open side with the inside surface position opposite the open side functioning both as a female embossing die and as a protective covering for the contents of the package, a thin thermoplastic film of multi-cubic-dimensional flexibility and a Noll Test softness of 225 or more lining the inside of said receptacle in substantially perfect conformity with, but in non-adhering relationship to, the multi-cubic-dimensioned embossing surfaces of the receptacle, and functioning as a divider and a release-agent between said receptacle and said contents, a quantity of butter or margarine having been filled into said film-lined embossing receptacle so as to adhere to said liner and receive on its film-adhering surfaces the imprint of the film-lined multi-cubic-dimensioned embossing receptacle-die, the embossing surfaces of said receptacle-die and the embossed surfaces of said film and the contents all cooperating to provide an interlock between their several mating surfaces for the purpose of preventing any side shift or movement of said surfaces of an embossment-damaging type, and a closure means extending across said open side of said package to provide a sealed package.

2. The structure of claim 1 in which the thermoplastic film is of an order of softness that after being peeled off from said contents it is no longer equipped with the embossed configuration.

3. The structure of claim 1 in which the thermoplastic film has a thickness in the range of about 0.0005" to about 0.001".

References Cited

UNITED STATES PATENTS

| | | |
|---|---|---|
| 2,631,939 | 3/1953 | Peters. |
| 2,657,998 | 11/1953 | Peters. |
| 2,666,710 | 1/1954 | Peters. |
| 2,689,183 | 9/1954 | Colt. |
| 2,703,287 | 3/1955 | Peters _____ 99—178 X |

TIM R. MILES, Primary Examiner